United States Patent [19]

Lorenz et al.

[11] Patent Number: 4,622,391

[45] Date of Patent: Nov. 11, 1986

[54] INCLUSION COMPOUNDS, INTERCALATION COMPOUNDS, AND SOLID SOLUTIONS OF COLORED ORGANIC METAL COMPOUNDS WHICH CONTAINS A NICKEL SALT OR NICKEL COMPLEX OF AN AZOBARBITURIC ACID OR ITS TAUTOMER

[75] Inventors: Manfred Lorenz, Cologne; Karl H. Schündehütte, Leverkusen, both of Fed. Rep. of Germany

[73] Assignee: Bayer Aktiengesellschaft, Leverkusen, Fed. Rep. of Germany

[21] Appl. No.: 734,377

[22] Filed: May 15, 1985

Related U.S. Application Data

[63] Continuation of Ser. No. 667,526, Nov. 2, 1984, abandoned, which is a continuation of Ser. No. 602,845, Apr. 23, 1984, abandoned, which is a continuation of Ser. No. 408,345, Aug. 16, 1982, abandoned.

[30] Foreign Application Priority Data

Sep. 2, 1981 [DE] Fed. Rep. of Germany ....... 3134725
Apr. 29, 1982 [DE] Fed. Rep. of Germany ....... 3215876

[51] Int. Cl.$^4$ ............... C09B 27/00; C09B 29/036; C09B 29/52; C09B 45/14; C09B 45/22; C06P 1/04; C06P 1/10; C06P 1/50
[52] U.S. Cl. ............... 534/707; 106/288 Q; 106/308 Q; 106/308 M; 106/23; 106/292; 106/297; 106/299; 106/301; 106/302; 106/304; 106/306; 534/579; 534/581; 534/582; 534/587; 534/602; 534/610; 534/728; 534/767; 534/887; 523/461; 524/190
[58] Field of Search ............... 534/767, 607, 610, 707; 106/288 Q, 308 Q, 302, 304, 306, 292, 297, 299, 301; 524/190; 523/461

[56] References Cited

U.S. PATENT DOCUMENTS 3,869,439  3/1975  Schundehutte et al. ....... 260/154 X

FOREIGN PATENT DOCUMENTS 1103750  2/1968  United Kingdom ............... 260/154

OTHER PUBLICATIONS

Teijin, Ltd., Chemical Abstracts, vol. 83, 149008n (1975).

*Primary Examiner*—Floyd D. Higel
*Attorney, Agent, or Firm*—Sprung Horn Kramer & Woods

[57] ABSTRACT

New inclusion compound, intercalation compounds or solid solutions which are the nickel salts or nickel complexes of a compound which, in one of its tauteromeric structures, corresponds to the formula

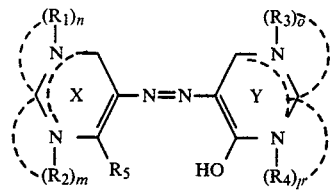

which contain at least one other included compound, except for one composition of matter which consists of 45 to 82% by weight of azobarbituric acid/nickel 1:1 complex, 3 to 15% by weight of benzene-sulphonamide, 5 to 20% by weight of nickel acetate and 10 to 20% by weight of water and the use of these materials as pigments are disclosed.

20 Claims, No Drawings

INCLUSION COMPOUNDS, INTERCALATION COMPOUNDS, AND SOLID SOLUTIONS OF COLORED ORGANIC METAL COMPOUNDS WHICH CONTAINS A NICKEL SALT OR NICKEL COMPLEX OF AN AZOBARBITURIC ACID OR ITS TAUTOMER

This is a continuation of application Ser. No. 667,526, filed Nov. 2, 1984, now abandoned, which is a continuation of application Ser. No. 602,845 filed on Apr. 23, 1984, now abandoned; which is a continuation of application Ser. No. 408,345 filed Aug. 16, 1982, now abandoned.

The invention relates to new inclusion compounds, intercalation compounds and solid solutions of coloured organic metal compounds, processes for their preparation, and their use as pigments.

The new compounds or solid solutions are characterised in that a coloured organic metal compound which forms a crystal lattice with a layer structure in which the bonding within a layer takes place essentially via hydrogen bonds and/or metal ions contains at least one other included compound, except for a composition of matter which consists of 45 to 82% by weight of an azobarbituric acid/nickel 1:1 complex, 3 to 15% by weight of benzenesulphonamide, 5 to 20% by weight of nickel acetate and 10 to 20% by weight of water.

These preferably are coloured organic metal compounds which form a crystal lattice which consists of essentially flat layers.

Not only organic but also inorganic compounds can be included.

The coloured organic metal compounds which form the new inclusion compounds, intercalation compounds or solid solutions are preferably metal salts or metal complexes of compounds which, in one of their tautomeric structures, correspond to the formula

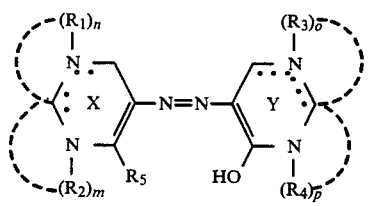

I in which the rings designated

X and Y can each carry one or two substituents from the series comprising =O, =S, =NR$_7$, —NR$_6$R$_7$, —OR$_6$, —SR$_6$, —COOR$_6$, —CN, —CONR$_6$R$_7$, —SO$_2$R$_8$,

alkyl, cycloalkyl, aryl and aralkyl, the total number of the endocyclic and exocyclic double bonds for each of the rings X and Y being three, R$_6$ represents hydrogen, alkyl, cycloalkyl, aryl or aralkyl and R$_7$ represents hydrogen, cyano, alkyl, cycloalkyl, aryl, aralkyl or acyl, and R$_8$ designates alkyl, cycloalkyl, aryl or aralkyl, R$_1$, R$_2$, R$_3$ and R$_4$ represent hydrogen, alkyl, cycloalkyl, aryl or aralkyl and can also, as indicated by the broken lines in the formula I, form 5- or 6-membered rings to which further rings can be fused, R$_5$ designates —OH, —NR$_6$R$_7$, alkyl, cycloalkyl, aryl or aralkyl, it being possible for the substituents mentioned for R$_1$–R$_8$ and containing CH bonds in turn to be substituted and m, n, o and p to designate 1, or in the case where double bonds extend from the ring nitrogen atoms, as indicated by the dotted lines in the formula I, also O.

The coloured organic metal compounds are preferably also the following compounds:

1. Compounds which, in the form of their free acids, correspond to the formula I in which the ring designated X represents a ring of the formula

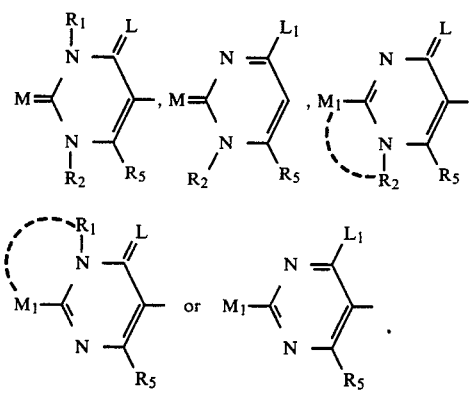

in which

L and M =O, =S, or =NR$_6$,

L$_1$ designates hydrogen, —OR$_6$, —SR$_6$, —NR$_6$R$_7$, —COOR$_6$, —CONR$_6$R$_7$, —CN, alkyl, cycloalkyl, aryl or aralkyl and M$_1$ designates —OR$_6$, —SR$_6$, —NR$_6$R$_7$, —COOR$_6$, —CONR$_6$R$_7$, —CN, —SO$_2$R$_8$,

alkyl, cycloalkyl, aryl or aralkyl, it being possible for the substituents M$_1$ and R$_1$ or M$_1$ and R$_2$ to form a 5- or 6-membered ring.

2. Compounds which, in the form of their free acids, correspond to the formula I in which the ring designated Y represents a ring of the formula

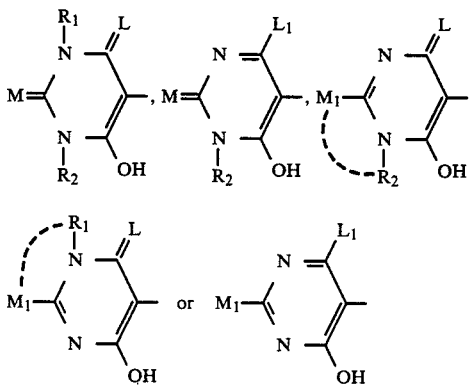

3. Compounds which, in the form of their free acids, correspond in one of their tautomeric structures to the formula II or III

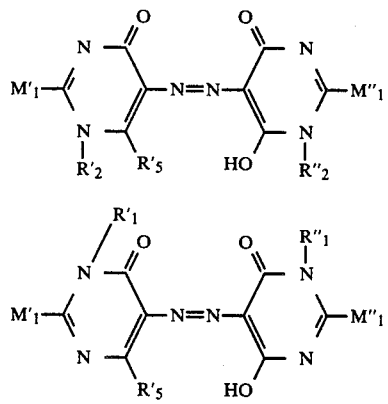

in which

R$_5'$ designates —OH or —NH$_2$,

R$_1'$, R$_1''$, R$_2'$ and R$_2''$ represent hydrogen and

M$_1'$ and M$_1''$ designate hydrogen, —OH, —NH$_2$, —NHCN, arylamino or acylamino.

In the above formula, the substituents preferably have the following meanings:

Substituents within the meaning of alkyl preferably designate C$_1$-C$_6$-alkyl which can be substituted, for example by halogen, such as chlorine, bromine or fluorine, —OH, —CN, —NH$_2$ or C$_1$-C$_6$-alkoxy.

Substituents within the meaning of cycloalkyl preferably designate C$_3$-C$_7$-cycloalkyl, in particular C$_5$-C$_6$-cycloalkyl which can be substituted, for example by C$_1$-C$_6$-alkyl, C$_1$-C$_6$-alkoxy, halogen, such as Cl, Br or F, C$_1$-C$_6$-alkoxy, —OH, —CN or —NH$_2$.

Substituents within the meaning of aryl preferably designate phenyl or naphthyl, which can be substituted, for example by halogen, such as F, Cl or Br, —OH, C$_1$-C$_6$-alkyl, C$_1$-C$_6$-alkoxy, —NH$_2$, —NO$_2$ or —CN.

Substituents within the meaning of aralkyl preferably designate phenyl- or naphthyl-C$_1$-C$_4$-alkyl, which can be substituted in the aromatic radicals, for example by halogen, such as F, Cl or Br, —OH, C$_1$-C$_6$-alkyl, C$_1$-C$_6$-alkoxy, —NH$_2$, —NO$_2$ or —CN.

Substituents within the meaning of acyl preferably designate (C$_1$-C$_6$-alkyl)-carbonyl, phenylcarbonyl, C$_1$-C$_6$-alkylsulphonyl, phenylsulphonyl, carbamoyl optionally substituted by C$_1$-C$_6$-alkyl, phenyl or naphthyl, sulphamoyl optionally substituted by C$_1$-C$_6$-alkyl, phenyl or naphthyl or guanyl optionally substituted by C$_1$-C$_6$-alkyl, phenyl or naphthyl, it being possible for the alkyl radicals mentioned to be substituted, for example by halogen, such as Cl, Br or F, —OH, —CN, —NH$_2$ or C$_1$-C$_6$-alkoxy and for the phenyl and naphthyl radicals mentioned to be substituted, for example by halogen, such as F, Cl or Br, —OH, C$_1$-C$_6$-alkyl, C$_1$-C$_6$-alkoxy, —NH$_2$, —NO$_2$ or —CN.

In the case where, as indicated in the formula I by the broken lines, M$_1$R$_1$ or M$_1$R$_2$ or R$_1$, R$_2$, R$_3$ and R$_4$ form 5- or 6-membered rings, the latter preferably are triazole, imidazole, benzimidazole, pyrimidine or quinazoline ring systems.

Possible salts of compounds of the formula I are preferably the salts and complexes of mono-, di-, tri-and tetra-anions with the metals Li, Cs, Mg, Cd, Co, Al, Cr, Sn, Pb, particularly preferably Na, K, Ca, Sr, Ba, Zn, Fe, Ni, Cu or Mn.

The nickel salts or complexes are of particular importance.

The metal salts and complexes of cyanoiminoazobarbituric acid which, in one of its tautomeric forms, corresponds to the formula

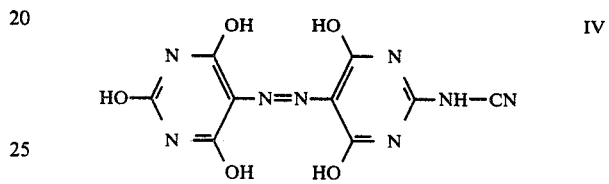

in particular the salts and complexes of the mono- or di-anion are also of particular importance within the scope of the present invention as host compound for the solid solutions and inclusion and intercalation compounds.

The salts can be illustrated, for example by the following formula:

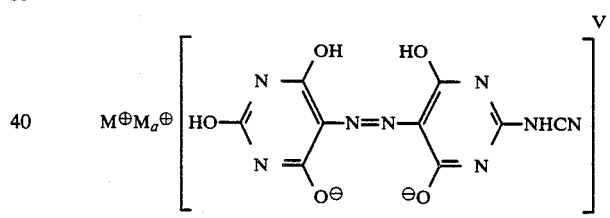

in which

M$^\oplus$ and M$^\oplus$ denote identical or different cations;

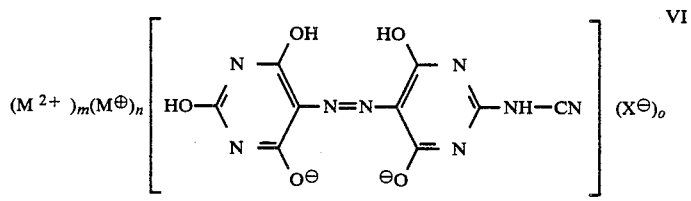

in which

M$^{2+}$ and M$^\oplus$ denote cations and

X$^\ominus$ denotes an anion and in which the following value combinations for m, n and o are possible: m=1, n=0, o=0; m=2, n=0, o=2; and m=1, n=1, o=1; and in the case where o=2 the two X$^\ominus$ radicals can be identical or different or can also belong to a divalent anion

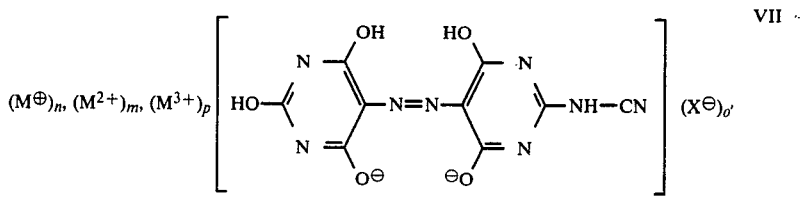

in which

M⊕, M²⁺ and M³⁺ designate cations and

X⊖ designates an anion and in which the following value combinations are possible for n′, m′, p and o′: n′=0, m′=0, p=2, o′=4; n′=0, m′=0, p=1, o′=1; n=1, m′=0, p=1, o′=2; and n′=0, m′=1, p=1, o′=3;

and in the case where o′ is 1 the X⊖ radicals can be identical or different or belong to a polyvalent anion.

Possible cations are preferably H⊕ and/or the cations of monovalent, divalent and/or trivalent metals such as Li, Cs, Na, K, Mg, Ca, Sr, Ba, Zn, Cd, Fe, Co, Ni, Cu, Al, Cr, Mn, Sn or Pb, of which K, Ca, Sr, Ba, Zn and Cd are particularly preferably.

The anionic X⊖ radicals are derived from organic or inorganic acids, such as formic acid, acetic acid, succinic acid, tartaric acid, hydrogen chloride, hydrogen bromide, hydrogen iodide, hydrogen fluoride, sulphuric acid, phosphoric acid or nitric acid. X⊖ preferably also represents the mono- or di-anion of the cyanoiminobarbituric acid of the formula I.

Salts of the formula I or II in which M⊕ represents H⊖ and M⊕ designates K⊖ or M²⁺ designates Ba²⁺, Ca²⁺, Sr²⁺ or Ni²⁺ are preferable. The nickel salt of the formula

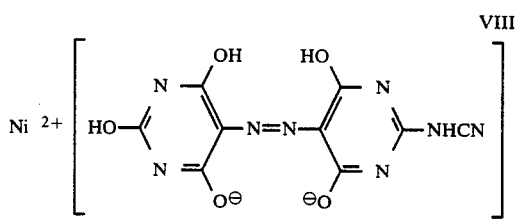

is also of particular importance.

The new inclusion compounds, intercalation compounds and solid solutions are particularly preferably based on a salt or complex of azobarbituric acid, in particular a Cu, Co or Ni salt or complex.

Those inclusion compounds, intercalation compounds and solid solutions are very particularly preferable in which the azobarbituric acid/nickel 1:1 complex which, in one of its tautomeric forms, has the structure:

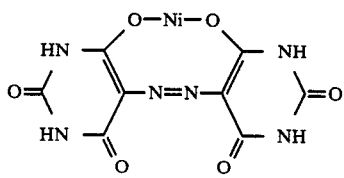

contains at least one other included compound.

Possible inclusion compounds, intercalation compounds and solid solutions of this type are also those in which a metal-containing compound, for example a salt or metal complex, is incorporated into the crystal lattice of the nickel complex. In this case, in the formula IX some of the nickel can be replaced by other metal ions, or other metal ions can enter into a more or less pronounced interaction with the nickel complex.

The 1:1 nickel complex is characterised by four absorptions in the double bond vibration region of the IR spectrum which usually also occur in its inclusion compounds, intercalation compounds and solid solutions, possibly with small shifts in the maxima. These absorption maxima are (in KBr) at 5.7 to 5.9μ, 6.1 to 6.4μ, 6.9 to 7.1μ, and 7.1 to 7.3μ, it being possible for the last-mentioned absorptions also to be fused into a single band. The absorptions of the included materials may be superimposed on these absorptions.

The solid solutions or inclusion compounds are distinguished from a mixture of the components by differing, in at least one physical property, from the sum total of properties of the components.

Considerable differences can arise, for example in solution properties. Thus, for example, the concentration of a soluble substance in a solvent will be considerably lower if the substance is present not as a pure substance but as a component of an inclusion compound, intercalation compound or solid solution.

For example, in the case of a sparingly soluble substance an amount of solvent which is normally sufficient for completely dissolving this substance will, in the case of the inclusion compound, intercalation compound or solid solution, not be sufficient for extraction purposes. On the other hand, it is conceivable that a solvent has such a pronounced affinity for the compound included that it can more or less completely displace the substance dissolved therein, and an inclusion compound is again formed.

An essential feature in which the solid solutions, inclusion compounds or intercalation compounds according to the invention can differ from a mixture of the components are X-ray powder diagrams, which cannot be obtained by adding the diagrams of the individual components. In the simplest case, the intensities of several lines change, but, as a rule, only a slight or virtually non-existent similarity with the diagrams of the individual components remains; only if one component is present in excess, will its lines then appear in addition to those of the inclusion compound. These distinguishing features between a solid solution, an intercalation compound or an inclusion compound and a mixture are known to an expert and can be taken from the literature.

Compounds which can be included belong to a very wide variety of compound classes. For purely practical reasons, those compounds are preferable which are liquid or solid under normal conditions.

Among the liquid substances, those are in turn preferable which have a boiling point of 100° C. or above, particularly of 150° C. and above. Suitable compounds are preferably acyclic and cyclic organic compounds, for example aliphatic and aromatic hydrocarbons, which can be substituted, for example by OH, COOH, $NH_2$, substituted $NH_2$, $CONH_2$, substituted $CONH_2$, $SO_2NH_2$, substituted $SO_2NH_2$, $SO_3H$, halogen, $NO_2$, CN, —$SO_2$-alkyl, —$SO_2$-aryl, —O-alkyl, —O-aryl or —O-acyl.

Examples which may be mentioned in particular are paraffins and paraffin oils, triisobutylene, tetraisobutylene, mixtures of aliphatic and aromatic hydrocarbons, as obtained, for example, in the fractionation of petroleum, chlorinated paraffin hydrocarbons, such as dodecyl chloride or stearyl chloride, $C_{10}$–$C_{30}$-alcohols, such as 1-decanol, 1-dodecanol, 1-hexadecanol, 1-octadecanol and their mixtures, oleyl alcohol, 1,12-octadecanediol, fatty acids and their salts and mixtures, for example formic acid, acetic acid, dodecanoic acid, hexadecanoic acid, octadecanoic acid, oleic acid, fatty acid esters, for example the methyl esters of $C_{10}$–$C_{20}$-fatty acids, fatty acid amides, such as stearamide, stearic acid monoethanolamide or stearic acid diethanolamide, stearonitrile, fatty amines, for example dodecylamine, cetylamine, hexadecylamine, octadecylamine and others, salts of fatty amines with sulphonic and carboxylic acids, isocyclic hydrocarbons, such as cyclododecane, decahydronaphthalene, o-, m-, p-xylene, mesitylene, dodecylbenzene mixture, tetralin, naphthalene, 1-methylnaphthalene, 2-methylnaphthalene, biphenyl, diphenylmethane, acenaphthene, fluorene, anthracene, phenanthrene, m-, p-terphenyl, o-, p-dichlorobenzene, nitrobenzene, 1-chloronaphthalene, 2-chloronaphthalene or 1-nitronapthalene, isocyclic alcohols and phenols and their derivatives, such as benzyl alcohol, decahydro-2-naphthol or diphenyl ether, sulphones, for example diphenyl sulphone, methylphenyl sulphone or 4,4'-bis-2-hydroxyethoxydiphenyl sulphone, isocyclic carboxylic acids and their derivatives, such as benzoic acid, 3-nitrobenzoic acid, cinnamic acid, 1-naphthalenecarboxylic acid, phthalic acid, dibutyl phthalate, dioctyl phthalate, tetrachlorophthalic acid, 2-nitrobenzamide, 3-nitrobenzamide, 4-nitrobenzamide or 4-chlorobenzamide, sulphonic acids, such as 2,5-dichlorobenzenesulphonic acid, 3- or 4-nitrobenzenesulphonic acid, 2,4-dimethylbenzenesulphonic acid, 1- and 2-naphthalenesulphonic acid, 5-nitro-1- and 5-nitro-2-naphthalenesulphonic acid, di-sec.-butylnaphthalenesulphonic acid mixture, biphenyl-4-sulphonic acid, 1,4-, 1,5-, 2,6- or 2,7-naphthalenedisulphonic acid, 3-nitro-1,5-naphthalenedisulphonic acid, anthraquinone-1-sulphonic acid, anthraquinone-2-sulphonic acid, diphenyl-4,4'-disulphonic acid or 1,3,6-naphthalenetrisulphonic acid, and the salts of the abovementioned sulphonic acids, for example the sodium, potassium, calcium, zinc, nickel and copper salts, sulphonamides, such as benzenesulphonamide, 2-, 3- and 4-nitrobenzenesulphonamide, 2-, 3- and 4-chlorobenzenesulphonamide, 4-methoxybenzenesulphonamide, 3,3'-sulphonyl bis-benzenesulphonamide, 4,4'-hydroxy bisbenzenesulphonamide and 1- and 2-naphthalenesulphonamide.

Carboxyamides and sulphonamides are a preferable group of compounds to be included, and urea and substituted ureas, such as phenylurea, dodecylurea and others, and heterocyclic compounds, such as barbituric acid, benzimidazolone, benzimidazolone-5-sulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine and cyanuric acid are also particularly suitable.

Preferable solid solutions, intercalation compounds or inclusion compounds contain surface-active compounds, in particular surfactants, which are described, for example, in K. Lindner, Tenside-Textilhilfsmittel-Waschrohstoffe [Surfactants-Textile Auxiliaries-Detergent Bases], 2nd Edition, Volume I, Wissenschaftliche Verlagsgesellschaft mbH, Stuttgart, 1964. These compounds can be anionic, nonionic or cationic compounds or ampholytes. Examples of suitable anionic compounds are genuine soaps, salts of aminocarboxylic acids, salts of lower or higher acylated aminocarboxylic acids, fatty acid sulphates, sulphates of fatty acid esters, amides and the like, primary alkyl sulphates, sulphates of oxo alcohols, secondary alkyl sulphates, sulphates of esterified or etherified polyoxy compounds, sulphates of substituted polyglycol ethers (sulphated ethylene oxide adducts), sulphates of acylated or alkylated alkanolamines, sulphonates of fatty acids, their esters, amides and the like, primary alkylsulphonates, secondary alkylsulphonates, alkylsulphonates having acyls bonded ester-like, alkyl ether sulphonates, alkyl phenyl ether sulphonates, sulphonates of polycarboxylic acid esters, alkylbenzene sulphonates, alkylnaphthalenesulphonates, fatty aromatic sulphonates, alkylbenzimidazole sulphonates, phosphates, polyphosphates, phosphonates, phosphinates, thiosulphates, hydrosulphites, sulphinates and persulphates. Examples of suitable nonionic compounds are esters and ethers of polyalcohols, alkylpolyglycol ethers, acylpolyglycol ethers, alkylarylpolyglycol ethers and acylated or alkylated alkanolaminepolyglycol ethers. Examples of suitable cationic compounds are alkylamine salts, quaternary ammonium salts, alkylpyridinium salts, simple and quaternary imidazoline salts, alkyldiamines, alkylpolyamines, acyldiamines, acylpolyamines, acylalkanolamines, alkanolamine esters, alkyl-$OCH_2$—N-pyridinium salts, alkyl-CO—NH—$CH_2$—N-pyridinium salts, alkyleyleneureas, sulphonium compounds, phosphonium compounds, arsonium compounds, alkylguanidines, and acylbiguanidides. Examples of suitable ampholytes are alkylbetaines, sulphobetaines and aminocarboxylic acids. Nonionic surfactants, in particular the ethylene oxide addition products of fatty alcohols, fatty amines and of octylphenol or nonylphenol, are preferably used.

Another important group of compounds which, with a suitable host compound, form solid solutions, inclusion compounds or intercalation compounds are natural resins and resin acids, such as, for example, abietic acid and its conversion products and salts. Examples of these conversion products are hydrogenated, dehydrogenated and disproportionated abietic acids. The latter can also be dimerised, polymerised or modified by addition of maleic anhydride and fumaric acid. Of interest are also resin acids modified at the carboxyl group, such as, for example, the methyl, hydroxyethyl, glycol, glycerol or pentaerythritol esters, and resin acid nitriles and resin acid amines and dehydroabietyl alcohol.

Polymers, preferably water-soluble polymers, for example ethylene/propylene oxide block polymers, polyvinyl alcohol, poly(meth)acrylic acids or modified celluloses, such as carboxymethylcelluloses, hydroxyethylcelluloses, hydroxypropylcelluloses, methylhydroxyethylcelluloses or ethylhydroxyethylcelluloses, are also suitable for embedding.

Of very particular importance are materials in which a dyestuff or dyestuff mixtures have been embedded in the molecular skeleton of the organic metal compound, in particular the metal salts or complexes of compounds I, since special effects, such as, for example, higher tinctorial strength or other hues, can thereby be obtained. The dyestuffs can belong to a very wide variety of dyestuff classes. Possible examples are azo dyestuffs, anthraquinone dyestuffs, quinophthalone dyestuffs, azomethines, phthalocyanine dyestuffs and triphenylmethane dyestuffs.

Those solid solutions and intercalation or inclusion compounds are particularly important in which monoazo or disazo dyestuffs having 1–3 sulpho groups, in particular coupling products of naphtholsulphonic acids or naphthylaminesulphonic acids, have been embedded.

The amount of substance which can be embedded in the crystal lattice of the metal compounds is as a rule between 5% and 120% by weight, relative to the amount of host compound. Between about 10 and about 100% by weight are preferably embedded. This amount of substance is the amount which cannot be washed out by suitable solvents and which is inferred from elemental analysis. It is of course possible to add more or less than the amount of substance mentioned and, if appropriate, washing out of an excess can be dispensed with. The amounts are preferably between 10 and 150%.

Compounds according to the formula I can be prepared by reacting a pyrimidine derivative which is unsubstituted in the "5"-position with a 5-diazopyrimidine derivative under suitable conditions, the two components being so chosen that the resulting substitution pattern corresponds to the formula I.

5-Diazopyrimidines suitable as starting products have been described in the literature or can be prepared by methods described in the literature. Preparation methods have been summarised, for example by M. Regitz in S. Patai, "The Chemistry of Diazonium and Diazo Groups", part 2, John Wiley & Sons, 1978, page 751.

Examples of preferable preparation methods are the reaction of a 5-aminopyrimidine or 5-sulphaminopyrimidine derivative with nitrous acid and the so-called azo group transfer, in which an azo group is transferred from an arylsulphonyl azide to a CH-acidic pyrimidine derivative which is unsubstituted in the 5-position. Suitable examples of starting products for these preparation methods are the following pyrimidine derivatives:

barbituric acid and its derivatives, such as 2-amino-, 2-cyanamino-, 2-ureido-, 2-acetylamino-, 2-benzoylamino, 2-methylsulphonylamino-, 2-guanidino-, 2-phenylsulphonylamino-, 2-anilino-, 2-(2-chloroanilino)-, 2-(3-chloroanilino)-, 2-(4-chloroanilino)-, 2-(3,4-dichloroanilino)-, 2-(2,5-dichloroanilino)-, 2-(2-nitroanilino)-, 2-(3-nitroanilino)-, 2-(4-nitroanilino)-, 2-(2-methoxyanilino)-, 2-(4-methoxyanilino)-, 2-(2-methylanilino)-, 2-(4-methylanilino)-, 2-(2,4-dimethylanilino)-, 2-benzylamino-, 2-methylamino-, 2-dimethylamino-, 2-methyl-, 2-butyl-, 2-ethyl-, 2-propyl-, 2-hexyl-, 2-benzyl- and 2-phenyl-4,6-dihydroxypyrimidine; 4,6-dihydroxypyrimidine; 1-methylbarbituric acid, 1-ethylbarbituric acid, 1-benzylbarbituric acid, 1-phenylbarbituric acid and 1-(4-chlorophenyl)-, 1-(2-chlorophenyl)-, 1-(3,4-dichlorophenyl)-, 1-(4-methylphenyl)-, 1-(2,4-dimethylphenyl)- and 1-(3-nitrophenyl)-barbituric acid; uracil; and 4-benzyl-, 4-ethyl-, 4-methyl- and 4-phenyl-2,6-dihydroxypyrimidine.

The 5-diazopyrimidines accessible from these or similar pyrimidine derivatives, for example by azo group transfer or by another way, can be reacted under suitable conditions with CH-acidic pyrimidine derivatives which are unsubstituted in the 5-position to form derivatives of azobarbituric acid. Possible pyrimidine derivatives suitable for such a coupling reaction and unsubstituted in the 5-position are the same pyrimidine derivatives which can also be used as starting products for preparing 5-diazopyrimidine. Additional examples which may be listed are 4-amino-2,6-dihydroxypyrimidine, 2,4-diamino-6-hydroxypyrimidine, 4,6-diamino-2-hydroxypyrimidine, 4-amino-2-cyanamino-6-hydroxypyrimidine, 2-phenyl-4-amino-6-hydroxypyrimidine, cytosine, orotic acid, 4-carbamoyl-2,6-dihydroxypyrimidine, 4-carboxy-6-hydroxy-2-phenylpyrimidine, 7-hydroxy-5-methyl-s-triazolo[1,5-a]pyrimidine, 2,5-dimethyl-7-hydroxy-s-triazolo[1,5-a]pyrimidine; 5,7-dihydroxy-s-triazolo[1,5-a]pyrimidine, 5,7-dihydroxy-2-methyl-s-triazolo[1,5-a]pyrimidine, 7-amino-5-hydroxy-s-triazolo[1,5-a]pyrimidine, 7-amino-5-hydroxy-2-methyl-s-triazolo[1,5-a]pyrimidine, 2,4-dihydroxypyrimidine[1,2-a]benzimidazole, 4-amino-2-hydroxypyrimido[1,2-a]benzimidazole, 2H-pyrimido[2,1-b]benzothiazole-2,4-(3H)-dione.

All pyrimidine derivatives mentioned can be used singly or as mixtures.

The coupling reaction can be carried out in various ways. Thus, for example, the 5-diazopyrimidines, after their preparation, can be first isolated and, if necessary, purified by recrystallisation or reprecipitation. However, a preferable process consists in directly—without intermediate isolation—reacting the 5-diazopyrimidines formed in the so-called azo group transfer.

The coupling reaction is preferably carried out in an aqueous medium within a weakly acid to weakly alkaline pH range, that is to say between pH about 2 and pH about 12.

If the 5-diazopyrimidine, in one of its tautomeric forms, has a hydrogen atom on one of its ring nitrogen atoms, the NH-acidity thereby brought about can have the effect that the diazopyrimidine, in the neutral to alkaline range, transforms into the less reactive anion. In this case, the pH range is advantageously chosen in such a way that the diazopyrimidine is wholly or partially present in its undissociated form. On the other hand, the pyrimidine derivatives which are unsubstituted in the 5-position and serve as coupling components react particularly rapidly when wholly or partially present as an anion. It follows that in many cases the maximum reaction rate lies within a certain pH range which differs from case to case and can, if desired, be determined by preliminary experiments.

Depending on the type of components and the pH value, the reaction time can be chosen between about one and 24 hours or even longer, and the reaction temperature can be chosen between 20° C. and 100° C. It can also be advantageous to work at an elevated temperature and under pressure.

The derivatives of azobarbituric acid formed in the reaction are weak to strong acids which, with suitable cations, form salts or complexes which can be derived from the mono-, di-, tri- or tetra-anions.

Examples of preferable suitable cations are the cations of alkali metals and alkaline earth metals, such as the cations of lithium, sodium, potassium, magnesium, calcium, strontium and barium, and also the cations of iron, cobalt, nickel, cadmium, manganese, zinc, aluminium, chromium and copper.

The salts or complexes can be prepared in various ways. For example, if, during the coupling reaction, suitable metal salts are present, those salts or complexes of azobarbituric acids can directly form which, as a function of the pH value, can be derived from the various dissociation stages of the azobarbituric acids. However, it is also possible first to couple and then to react the reaction product, either immediately, or, if necessary, after intermediate isolation and resuspension in a suitable solvent. The coupling reaction, depending on the type of components and the pH value, can either form undissociated azobarbituric acids or already salts, for example alkali metal salts, which can then be reacted with metal salts in a double decomposition.

The formation of the salt or complex is preferably carried out in an aqueous medium, and the pH values, depending on the type of components, must be between mineral-acidic and alkaline. The reaction temperature can be between 0° C. and 100° C., preferably 30°–100° C.; the reaction times can be between a few hours at low temperatures and a few minutes at high temperatures. In addition, to obtain particularly advantageous application properties, it can be useful to heat the product for longer than necessary for salt or complex formation, if appropriate even under pressure at elevated temperatures.

If, in the salt or complex formation, mixtures of metal salts are used, then, depending on the conditions, mixed salts or complexes can also be formed.

The formation of inclusion compounds, intercalation compounds or solid solutions, where additional substances are embedded in the molecular association, can be carried out in such a way that, before, during or after complex formation, the substance to be embedded or the mixture of substances is added in a suitable form to the reaction mixture, and the resulting mixture is heated between a few minutes and up to about 24 hours at temperatures between 30° and 100° C. Particularly in the case of sparingly soluble substances, it can also be advantageous here to work at elevated temperatures and under pressure. However, it is also possible to isolate the complex and to suspend the press cake or the dried substance in a suitable solvent and then to embed the desired substance in the same way.

The substances to be embedded can be added, depending on type and consistency, as solid substances, liquids, solutions, slurries, suspensions, dispersions or emulsions.

Cyanoiminoazobarbituric acid, and its salts and complexes, can be prepared in various ways:

1. Diazobarbituric acid is coupled within a weakly acid to neutral pH range with 2-cyanoiminobarbituric acid. To prepare salts according to the invention, suitable salts capable of double decomposition are added before, during or after the coupling reaction.

2. 2-cyanoimino-5-diazobarbituric acid is coupled in a neutral to weakly acid pH range with barbituric acid. Salts according to the invention can be prepared by adding salts which are capable of double decomposition before, during or after the coupling reaction.

3. Barbituric acid and 2-cyanoiminobarbituric acid are initially introduced and coupled to each other at pH 4–8 by means of an agent which transfers azo groups. To prepare salts according to the invention, suitable salts capable of double decomposition are added before, during or after the reaction.

The processes described under 1.–3. and, in general, the processes described above for preparing azobarbituric acids and their salts, complexes, solid solutions and inclusion and intercalation compounds can be carried out in aqueous, aqueous-organic or organic media, preferably at temperatures of 20°–150° C., particularly preferably 50°–100° C.

The preparation methods described can advantageously also be carried out in the presence of nonionic, anionic, cationic or ampholytic surface-active compounds.

Examples of suitable nonionic dispersing agents are nonionic reaction products of ethylene oxide with fatty alcohols or nonylphenol. Suitable anionic surface-active compounds are described in K. Lindner, Tenside-Textilhilfsmittel-Waschrohstoffe [Surfactants-Textile Auxiliaries-Detergent Bases], 2nd Edition, Wiss. Verlagsgesellschaft, Stuttgart, 1964, Volume I, pages 571–836, or in Ullmanns Encyklopädie der technischen Chemie [Ullman's Encyclopaedia of Industrial Chemistry], 4th Edition, Verlag Chemie, Weinheim/Bergstr., 1975, Volume 10, pages 457–458.

Anionic surface-active compounds from the following classes of material are particularly suitable: fatty acid salts and sulphates, sulphates of fatty acid esters and amides, alkyl sulphates, sulphates of alkoxylated alcohols, sulphates of acylated alkanolamines, long-chain alkylsulphonates ($C_6$–$C_{20}$), fatty acid ester sulphonates, fatty acid amide sulphonates, sulphosuccinic acid esters and amides, ($C_6$–$C_{20}$-alkyl)-acyltaurides, perfluorinated alkylsulphonates, alkylbenzenesulphonates (for example the "Marlon" range), alkylnaphthalenesulphonates, arylether sulphonates, alkylbenzimidazolesulphonates, alkoxycarboxylates, alkylmalonic acid salts, alkylsuccinic acid salts and soaps.

Suitable cationic or ampholytic surface-active compounds belong, for example, to the following classes of material: fatty amine salts, quaternary alkylammonium salts ("Hyamino" range), alkylbenzoylammonium salts ("Zephirol" range), alkanolamine salts of ethers or esters, alkylpyridinium salts or protein ampholytes, substituted betaines and sulphobetaines of the "Tego Betain" range and substituted aminocarboxylic acids. In this way it is possible to prepare pigment formulations which contain 0.01–30% by weight, relative to the weight of the azobarbituric acid compound, preferably 1–10% by weight, of surface-active compounds.

The reactions described above can be carried out not only in an aqueous medium but also in aqueous-organic or organic media. Examples of suitable organic solvents which can be present are formamide, N-methylformamide, N,N-dimethylformamide, acetamides, phosphoryl amides, dioxane, acetone, pyridine and its derivatives, such as the picolines, lutidines and collidine, monohydric or polyhydric alcohols, such as methanol, ethanol, isobutanol and ethylene glycol, and organic acids, such as formic acid and acetic acid; solvents which are completely or partially miscible with water, or mixtures of these solvents, are thus preferably used.

Examples of suitable metal salts for preparing the salts and complexes of azobarbituric acids are sodium chloride, potassium chloride, lithium chloride, lithium carbonate, caesium chloride, sodium nitrite, potassium nitrate, lithium hydroxide, sodium sulphate, potassium phosphate, magnesium chloride, magnesium sulphate, calcium chloride, calcium acetate, calcium formate, barium chloride, barium nitrate, barium acetate, barium carbonate, strontium nitrate, manganese chloride, manganese sulphate, iron(III) chloride, iron(III) nitrate, iron(II) sulphate, cobalt chloride, cobalt nitrate, cobalt sulphate, aluminium sulphate, aluminium nitrate, chromium(III) sulphate, chromium(III) nitrate, zinc chloride, zinc sulphate, zinc acetate, cadmium chloride, cadmium sulphate, cadmium nitrate, copper(II) sulphate, copper(II) chloride, copper(II) acetate, copper(II) formate, nickel chloride, nickel sulphate, nickel nitrate, nickel acetate and nickel formate.

It is also possible to use mixtures of these salts which can contain various of the metals mentioned. The use of such salt mixtures is particularly advisable for obtaining intermediate lines of the final coloured products.

Suitable agents transferring azo groups are compounds of the formula

R—N₃    VI in which
R represents an acyl radical, such as —CONH₂, —CO—NH-alkyl, —CON—(alkyl)₂, —COOR₁, R₂—SO₂ or a heterocyclic radical. Here R₁ denotes alkyl, aralkyl or aryl radicals and R₂ represents amino groups or alkyl, aralkyl, aryl or heterocyclic radicals. According to the invention, alkyl radicals are understood as meaning straight-chain and branched-chain, substituted and unsubstituted alkyl radicals. The amino groups can be substituted in any way desired.

Examples of azides suitable for the synthesis are carbamoyl azide, methyl azidoformate, ethyl azidoformate, dimethylaminosulphonyl azide, methylsulphonyl azide, benzylsulphonyl azide, benzenesulphonyl azide, o-toluenesulphonyl azide, m-toluenesulphonyl azide, p-toluenesulphonyl azide, 3-nitrobenzenesulphonyl azide, 2-chlorobenzenesulphonyl azide, 4-chlorobenzenesulphonyl azide and 2-azido-3-ethylbenzothiazolium tetrafluoroborate.

The preparation of 2-cyaniminobarbituric acid is known, for example from German Patent Specification 158,591 (Friedländer, P. (Editor): Fortschritte der Teerfabrikation und verwandter Industriezweige [Advances in Tar Production and Related Industries], Volume 7, page 633, Berlin: J. Springer 1905).

To prepare 2-cyanimino-5-diazobarbituric acid in the form of the diazonium salt, the procedure followed is analogous to that used in the preparation of diazobarbituric acid (see, for example, M. Regitz, Liebigs Ann. Chem. 676, 101 (1964)).

The processes described produce the compounds in good yields and in high purity.

The metal lakes of azobarbituric acids contain, depending on the preparation conditions, varying amounts of water of hydration. 0–6, as a rule 2–4, molecules of water are found per empirical formula.

The preparation of some metal salts and metal complexes of azobarbituric acid is known from German Auslegeschrift No. 2,064,093.

The nickel complex of azobarbituric acid, its solid solutions and inclusion and intercalation compounds can also be prepared in various ways. A preferable process can be represented by the following simplified reaction scheme wherein many variants are possible:

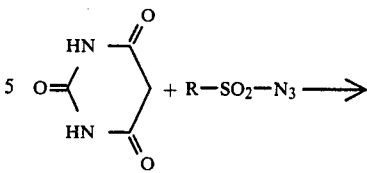

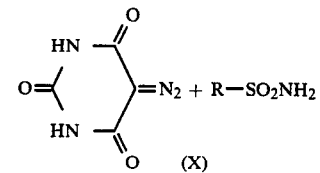

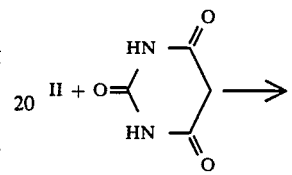

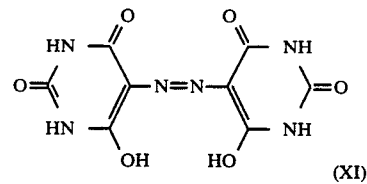

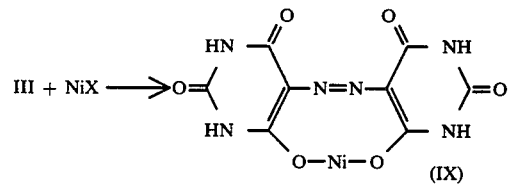

R here represents an optionally substituted aryl radical, and NiX represents a preferably water-soluble nickel salt.

In a first reaction step, an azo group is transferred in a way which is in itself known from an arylsulphonyl azide to barbituric acid to form diazobarbituric acid (X) and arylsulphonamide. This azo group transfer is preferably carried out in an aqueous medium at a temperature between 10° and 100° C., preferably between 30° and 80° C., it being possible for the reaction to be carried out not only in the acidic but also in the alkaline range, that is between pH about 2 and 14. Examples of sulphonyl azides suitable for this reaction are benzenesulphonyl azide, 2-, 3- or 4-chlorobenzenesulphonyl azide, o-, m- or p-toluenesulphonyl azide, 4-methoxybenzenesulphonyl azide, 3-nitrobenzenesulphonyl azide, 3,3'-sulphonyl bisbenzenesulphonyl azide, 4,4'-hydroxybis-benzenesulphonyl azide, 2,7-dibenzofurandisulphonyl azide, 1-naphthalenesulphonyl azide and 2-naphthalenesulphonyl azide.

In a second reaction step, diazobarbituric acid (X) is then coupled with a further molecule of barbituric acid to give azobarbituric acid (XI). This coupling reaction can be carried out under conditions identical to those of the azo group transfer, but an acid to neutral pH range, that is pH values of about 2 to 7 is advantageously chosen, since diazo-barbituric acid, at pH values of ≧5.5 to 6, forms less reactive salts with bases. This behaviour of the diazo-barbituric acid can also be exploited, so as to separate the two reaction steps partially or completely, by, for example, first transferring the azo group, partially or completely at a pH value of ≧7, and then coupling at a pH value between about 2 and 6. Diazobarbituric acid can also be isolated in an intermediate step, by, for example, reacting barbituric acid, if appropriate with a small excess, of about 1 to 10%, of sulphonyl azide, in the neutral to alkaline range to give a salt of diazobarbituric acid and isolating the latter after crystallising or salting out of the free diazobarbituric acid after acidifying. Salts of azobarbituric acid which can be isolated in this way are, for example, alkali metal salts, for example lithium, sodium or potassium salts, alkaline earth metal salts, for example magnesium, calcium, strontium, or barium salts, or the salts of nickel, zinc or manganese. If, on the other hand, the reaction is carried out from the start in an acidic to neutral range, azo group transfer and coupling will take place at the same time, and azobarbituric acid is obtained directly.

Azobarbituric acid is a strong acid and, in the pH ranges mentioned, it is always obtained in the form of its salts or metal complexes. This acid, depending on pH value or type of cations present, can act as a monobasic or dibasic acid. For instance, salts or complexes, for example with the cations of sodium, potassium, magnesium, calcium, strontium, barium, zinc, manganese, iron, cadmium, ammonium and the like, can be obtained. If in the reaction stages 1 and 2 compounds or salts of sodium are used, for example for buffering the acid, the monosodium salt of azobarbituric acid will be obtained. If, before, during or after these reaction steps, salts or compounds with other cations are added, salts or complexes or mixtures of salts or complexes with other cations are formed as a function of the amounts used, the reaction temperature, the reaction time and the pH value.

These salts or complexes of azobarbituric acid can be isolated in an intermediate step. An intermediate isolation at this point or an intermediate isolation of diazobarbituric acid can, under certain circumstances, be advantageous, since impurities or by-products, for example the sulphonamides formed in the azo group transfer, can be removed in this way, since these can otherwise also form solid solutions, possibly in competition with other added substances. The sulphonamides can be removed, for example by recrystallising, heating and washing with suitable solvents, for example water, methanol or ethanol, or by transformation into water-soluble salts and subsequent washing out.

The nickel complex of azobarbituric acid can be formed in a third reaction step in various ways. Thus, for example, coupling and complex formation can be carried out together by adding a solid or dissolved nickel salt before or during the coupling reaction, and coupling and complex formation takes place virtually simultaneously and the conditions are essentially the same as in a coupling alone. The nickel complex forms particularly rapidly and smoothly in this way. However, it is also possible to start from a prepared salt of azobarbituric acid and to react it with a nickel salt. In the simplest case, it is possible to start from a suspension of a salt or complex of azobarbituric acid, as formed in the coupling reaction in the way already described, or such a salt is isolated by filtering with suction, squeezing off or centrifuging, suspending the press cake or the product obtained after drying and, if appropriate, grinding, if appropriate with the addition of a dispersing or wetting agent in a suitable solvent and reacting with a nickel salt. Examples of suitable nickel salts are the chlorides, sulphates of nitrates of nickel and nickel acetate, nickel formate, nickel oxalate and nickel carbonate. The complex is preferably formed in an aqueous medium. The pH value can be between mineral-acid and strongly alkaline, preferably at ≦10. Preferable reaction temperatures are 30° to 100° C., and the reaction can, if appropriate, also be carried out at elevated temperatures under pressure. The reaction times required vary between a few hours at low temperatures and a few minutes at higher temperatures. To obtain good pigment properties it can moreover be advantageous to heat for longer than necessary for complex formation, if appropriate also at an elevated temperature under pressure.

The formation of solid solutions and inclusion and intercalation compounds in which additional substances are embedded in the molecular association of the nickel complex can be effected in such a way that, before, during or after complex formation, the substance to be embedded or the mixture of substances is added in a suitable form to the reaction mixture, and the resulting mixture is heated between a few minutes and up to 24 hours at temperatures between 30° and 100° C. Particularly in the case of sparingly soluble substances it can also be advantageous here to work at elevated temperatures and under pressure. However, it is also possible to isolate the nickel complex and to suspend the press cake or the dried substance in a suitable solvent and then to embed the desired substance in the same way.

The substances to be embedded can be added, depending on type and consistency, as solid substances, liquids, solutions, slurries, suspensions, dispersions or emulsions.

The preferable reaction medium for all reaction stages is water. It can be advantageous to add, in addition, a solvent which is completely or partially miscible with water. This can, for example, increase the solubility of the components, and thereby promote the reaction, and pigment properties, such as, for example, the dispersibility, can be improved thereby. Examples of such solvents are methanol, ethanol, propyl alcohol, isopropyl alcohol, n-butanol, isobutanol, acetone, methyl ethyl ketone, cyclohexanone, glycol, methylglycol, ethylglycol, butylglycol, glycol dimethyl ether, diglycol, diglycol dimethyl ether, diglycol diethyl ether, dioxane, dimethylformamide, dimethyl sulphoxide, sulpholane, N-methylpyrrolidone, pyridine and the like.

A similar effect can be obtained by adding a solvent which is immiscible, or only partially miscible, with water, if appropriate together with a suitable emulsifier. Examples of such solvents are toluene, xylene, chlorobenzene, dichlorobenzene, nitrobenzene, chloroform and methylene chloride.

All, or also part, reactions can also be carried out entirely in organic solvents, those already mentioned as being water-miscible or -immiscible being possible for this purpose.

The new inclusion compounds, intercalation compounds and solid solutions are highly suitable for use as pigments for all pigment applications.

For example, they are suitable for pigmenting paints of any kind, for preparing printing inks, distempers or emulsion paints, and for the mass colouration of synthetic, semi-synthetic or natural macromolecular materials, such as, for example, polyvinyl chloride, polystyrene, polyamide, polyethylene or polypropylene. They can also be used for spin-dyeing natural, regenerated or synthetic fibres, such as, for example, cellulose, polyester, polycarbonate, polyacrylonitrile or polyamide fibres, and for printing textiles and paper. Finely divided, stable, aqueous pigment dispersions, which can be used, for example, for pigmenting paints and emulsion paints, for colouring paper, for pigment-printing textiles or for spin-dyeing viscose, can be obtained from these pigments by milling or kneading in the presence of nonionic, anionic or cationic surFactants.

The new compounds or solid solutions are distinguished in particular by excellent thermostability, excellent light and weathering fastness properties and excellent solvent fastness properties. By preparing solid solutions or inclusion compounds, pigment properties, such as dispersibility, lustre, brilliance, hue and the like, can be affected in a controlled manner. In the examples which follow, the temperatures are given in °C.

The X-ray diffraction spectra are Debye-Scherrer diagrams (Cu-K αradiation, λ(K α)=1.5418 Å, Ni filter). The data given are the d values in Å and, in brackets, estimated intensities, the greatest intensity being set equal to 100. All lines are given down to a relative intensity of 10. Diffuse bands are identified by a small d.

EXAMPLE 1

(a) 25 g of benzenesulphonohydrazide, 200 ml of water, 20 ml of 10N hydrochloric acid and 1.25 g of a condensation product of stearic acid with taurine are stirred for 30 minutes. 60 g of ice are added, and 34 ml of an aqueous sodium nitrite solution containing 30 g of sodium nitrite in 100 ml of solution are then added dropwise in the course of about 30 minutes. The batch is stirred for 30 minutes, an excess of nitrite being maintained. The nitrite excess is then destroyed with a small amount of sulphamic acid, and excess acid is neutralised with about 5 ml of 10N sodium hydroxide solution. An emulsion of benzenesulphonyl azide is obtained.

(b) 38.2 g of barbituric acid are added to an emulsion prepared according 1(a), the mixture is stirred for 10 minutes, and the pH is then adjusted to 8 by means of about 33 ml of 10N sodium hydroxide solution. The batch is stirred for 2 hours at 50° C., adjusted to a pH 4.8 by means of 3 ml of acetic acid and about 14 ml of 10N hydrochloric acid, and heated for a further 1 hour at 70° C. and for 3 hours at 80° C. A suspension of the sodium salt of azobarbituric acid is obtained; in addition, about 22 g of benzenesulphonamide, formed as a by-product, are present in the dissolved state.

(c) A suspension prepared according to 1(b) is heated to 95° C. to 100° C. and filtered with suction, and the solids filtered off are washed with about 1 liter of boiling hot water in several portions. A press cake of the sodium salt of azobarbituric acid is obtained.

(d) A paste prepared according to 1(c) is stirred with 500 ml of water, the mixture is heated to 95° C., and a solution of 34.5 g of $NiCl_2 \times 6H_2O$ in 120 ml of water is added dropwise in the course of 5 minutes. If the batch is heated for a further 4 hours at 95° C., and the solids filtered off with suction, washed in several portions with 1 l of boiling hot water and dried in a circulating air cabinet at 70° C., 47.7 g of the 1:1 nickel complex of azobarbituric acid are obtained.

Analysis:
22.9% of N; 15.6% of Ni
IR spectrum (in KBr): 5.85μ, 6.35μ, 7.0μ, 7.2μ.

X-ray diffraction spectrum: 7.92 (100), 5.08 (20), 4.47 (20d), 3.84 (15), 3.46 (20), 3.21 (10), 2.974 (10).

The product colours stoving enamels in yellow shades.

EXAMPLE 2

If Example 1 is followed, but complex formation takes place at 70° C. instead of at 95° C. and the batch is then maintained for a further 1 hour at 70° C. and 3 hours at 95° C., a more intensely coloured product is obtained which in other respects has properties similar to those of the product of Example 1.

EXAMPLES 3 to 5

If a paste prepared according to 1(c) is stirred with 500 ml of water, 10 g, 20 g or 30 g of a commercially available addition product of 5 mols of ethylene oxide to a fatty alcohol mixture having an average chain length of 12 carbon atoms are added, the batch is heated to 90° C., a solution of 34.5. g of $NiCl_2 \times 6H_2O$ and 13 g of anhydrous sodium acetate in 120 ml of water is added in the course of about 5 minutes and in other respects Experiment 1(d) is followed, 59.3 g, 67.8 g and 80.7 g are obtained of an embedding product from which the readily soluble emulsifier cannot be washed out with water.

The products produce in stoving enamel an increasingly greenish-tinged clearer shade.

X-ray diffraction spectra:
Example 3: 10.31 (100d), 8.28 (80d), 4.69 (20d), 3.92 (25d), 2.823 (20d), 2.747 (10d), 2,463 (10d);
Example 4: 11.42 (30), 10.48 (100), 8.34 (20), 7.38 (15), 5.72 (10d), 5.21 (15), 4.70 (35), 4.15 (15), 3.89 (35), 2.82 (10d): and
Example 5: 11.54 (100), 8.22 (30), 5.77 (30), 5.21 (30), 4.74 (10), 4.20 (15), 3.84 (90), 2.896 (20), 2.796 (10), 2.323 (15), 1.931 (10).

EXAMPLE 6

If the process of Example 3 is followed, but 30 g of a reaction product of 4-(1-methyl-1-phenylethyl)-phenol with 27 mols of ethylene oxide are added, 76.9 g are obtained of a solid solution of this emulsifier in the nickel 1:1 complex of azobarbituric acid.

Analysis:
14.5% of N; 10.5% of Ni.
IR spectrum (in KBr): 5.58μ, 6.35μ, 7.0μ, 7.2μ (shoulder). A medium band at 9.8μ can be assigned to the ether functions of the emulsifier.
X-ray diffraction spectrum: 11.36 (100), 9.07 (15), 8.08 (20), 5.70 (60), 5.12 (10), 4.12 (10d), 3.81 (50).

The following Examples 7–10 can be prepared according to the process of Example 6 using the deviations listed in the table.

| Example | Additive | Amount | Heating | Yield |
|---|---|---|---|---|
| 7 | Avolan ONP ® (ethylene adduct of a Mannich base | 22.5 g | 1 h 70° C. 4 h 95° C. | 68.9 g |
| 8 | Emulgator U ® (ethylene oxide adduct of abietic acid) | 30 g | 1 h 70° C. 4 h 95° C. | 73.6 g |
| 9 | Addition product of 15 mols of ethlene oxide to nonylphenol | 30 g | 4 h 95° C. | 74.3 g |
| 10 | Armeen Z ® (addition product of a coconut fatty amine to crotonic | 30 g | | 66.9 g |

-continued

| Example | Additive | Amount | Heating | Yield |
|---|---|---|---|---|
| | acid) | | | |

X-ray diffraction spectrum of the product according to Example 9: 11.17 (100d), 7.85 (20d), 5.72 (50), 4.81 (40), 4.12 (40), 3.82 (45), 2.788 (15).

EXAMPLE 11

A press cake prepared according to 1(c) is stirred with 500 ml of water, 24 g of the sodium salt of 1,5-naphthalenedisulphonic acid are added, and a solution of 51 g of $NiCl_2 \times 6H_2O$ and 21 g of trisodium citrate x 5.5 $H_2O$ in 150 ml of water is added dropwise in the course of 5 minutes at 70° C. The mixture is heated for 1 hour at 70° C. and for 3 hours at 95° C., and the solids are filtered off with suction and washed with 1 l of boiling hot water. 76.5 g of a solid solution of the nickel salt of 1,5-naphthalenedisulphonic acid in the nickel complex of azobarbituric acid are obtained. The product colours stoving enamels in clear greenish-tinged yellow shades.

EXAMPLE 12

If Example 11 is followed, but 31 g of the sodium salt of 1,3,6-naphthalenetrisulphonic acid are added and 55.1 g of $NiCl_2 \times 6H_2O$ are used, 78 g of an embedding product of the nickel salt of 1,3,6-naphthalenetrisulphonic acid in the nickel complex of azobarbituric acid are obtained.
Analysis:
13.9% of N; 6.3% of S; 15.1% of Ni.

EXAMPLE 13

If Example 11 is followed, but 33 g of the sodium salt of 2-naphthalenesulphonic acid and 10 g of a commercially available block polymer of propylene oxide and ethylene oxide (Pluriol PE 6800) are added, 82.8 g of the corresponding embedding product are obtained.

X-ray diffraction spectrum: 11.47 (80), 9.39 (40d), 8.14 (10), 6.88 (80), 5.60 (40d), 5.04 (20), 4.82 (50), 4.57 (10), 3.94 (10), 3.81 (10), 3.66 (10), 3.44 (100), 2.656 (10), 2.536 (15d), 2,294 (10).

EXAMPLE 14

34.5 g of $NiCl_2 \times 6H_2O$ are added to a suspension, prepared analogously to Example 1(b), of the sodium salt of azobarbituric acid, and the mixture is then heated for 30 minutes at 70° C. and for 4 hours at 90° C. The batch is then worked up as in Experiment 1(c). 67.7 g of a product are obtained which, according to the elemental analysis, also contains 4.7% of sulphur. This amount of sulphur is equivalent to 15.6 g of benzenesulphonamide which is readily soluble in hot water and which is present as a solid solution in the nickel complex of azobarbituric acid. The compound colours stoving enamels in greenish-tinged yellow shades.

EXAMPLE 15

If Example 14 is followed, but an equivalent amount of 4-methylbenzenesulphonohydrazide, instead of benzenesulphonohydrazide, is used for preparing the sodium salt of azobarbituric acid, 68.4 g of a product are obtained which, according to the elemental analysis, contains 5.0% of sulphur, equivalent to 19.5 g of 4-methylbenzenesulphonamide. The compound has properties similar to those of the product obtained according to Example 14.

EXAMPLE 16

A press cake, prepared according to Example 1(c), of the sodium salt of azobarbituric acid is stirred with 500 ml of water, and an emulsion consisting of 20 g of a commercially available paraffin having a melting point of 42°-44° C., 10 g of an addition product of, on average, 5 mols of ethylene oxide to a fatty alcohol having an average chain length of 12 carbon atoms and 100 ml of water is added. The mixture is heated to 60° C., a solution of 34.5 g of $NiCl_2 \times 6H_2O$ and 21 g of trisodium citrate x 5.5 $H_2O$ in 100 ml of water is added, and the batch is then heated for 3 hours at 60° C. and for 1 hour at 95° C. After the customary working-up, 81.1 g of a product are obtained which also contains 4.3% of water. The substance colours stoving enamels in greenish-tinged yellow shades.

EXAMPLE 17

If a warm emulsion at 70° C. of 30 g of hexadecanol, 10 g of an addition product of 30 mols of ethylene oxide to nonylphenol and 100 ml of water is added to a suspension, prepared analogously to Example 16, of the sodium salt of azobarbituric acid at 70° C. and in other respects Example 16 is followed, but heating being carried out for 3 hours at 70° C. and for 1 hour at 95° C., 86.9 g of a product are obained which contains hexadecanol and the emulsifier embedded in the form of a solid solution.

EXAMPLE 18

A warm aqueous emulsion at 80° C. of 30 g of stearic acid and 12 g of a commercially available emulsifier based on an ethoxylated Mannich base is added at 80° C. to a suspension, prepared analogously to Example 16, of the sodium salt of azobarbituric acid, and the mixture is then heated for a further 1 hour at 80° C. and for 3 hours at 95° C. After the customary working-up, 85.2 g of a product are obtained which contains approximately 30 g of stearic acid as a solid solution. Incorporated in stoving enamels, the product produces greenish-tinged yellow shades.

EXAMPLE 19

A solution of 7.5 g of an addition product of 30 mols of ethylene oxide to nonylphenol, 42.5 g of a commercially available hydrogenated abietic acid resin (Staybelite ®) and 8 ml of 10N NaOH in 150 ml of water is added at 80° C. to a suspension, prepared analogously to Example 16, of the sodium salt of azobarbituric acid. The mixture is stirred for 30 minutes at 80° C., and a solution of 34.5 g of $NiCl_2 \times 6H_2O$ in 100 ml of water is then added dropwise in the course of about 30 minutes. The batch is stirred for 1 hour at 80° C. and for 2 hours at 95° C., and the solids are then filtered off hot with suction and washed with hot water. After the drying at 70° C. in a circulating air cabinet, 92.3 g of a pigment are obtained which, incorporated in plasticised PVC, produces greenish-tinged yellow shades.

EXAMPLE 20

A solution of 8 g of an addition product of 30 mols of ethylene oxide to nonylphenol and 16 g of a commercially available hydrogenated abietic acid resin (Staybelite ®) in a mixture of 100 ml of water and 4 ml of 10N NaOH is added at 80° C. to a suspension, prepared as in Example 16, of the sodium salt of azobarbituric acid. A solution of 34.5 g of NiCl$_2 \times$6H$_2$O and 13 g of anhydrous sodium acetate in 100 ml of water is then added dropwise in the course of about 5 minutes. The mixture is stirred for 1 hour at 80° C., 18 g of melamine are added, and the mixture is stirred for a further 1 hour at 80° C. and for 2 hours at 95° C. Customary working-up produces 91 g of a product which colours plasticised PVC in greenish-tinged yellow shades.

EXAMPLE 21

33.3 g of the sodium salt of 2-naphthalenesulphonic acid and then 44.8 g of NiCl$_2 \times$6H$_2$O and 13 g of anhydrous sodium acetate are added at 70° C. to a suspension, prepared as in Example 16, of the sodium salt of azobarbituric acid. The batch is stirred for 30 minutes at 70° C., and a solution of 11.7 g of stearylamine and 3 ml of acetic acid in 150 ml of water is then added. The batch is heated for a further 30 minutes at 70° C. and for 3 hours at 95° C. After the customary working-up, 86.8 g of a product are obtained which contains about 46 g of the 1:1 nickel complex and about 20 g each of the nickel and stearylammonium salt of 2-naphthalenesulphonic acid. The pigment colours plasticised PVC in greenish-tinged yellow shades.

EXAMPLE 22

A press cake prepared according to Example 1(c) is stirred with 600 ml of water, and 30 g of a commercially available block polymer of propylene oxide and ethylene oxide and having an average molecular weight of about 8,500 (Pluriol PE 6800) are added. The batch is stirred for 30 minutes at 50° C., a solution of 34.5 g of NiCl$_2 \times$6H$_2$O and 21 g of trisodium citrate in 150 ml of water is added dropwise in about 5 minutes, and the mixture is heated for a further 2 hours at 50° C. and for 4 hours at 95° C. After the customary working-up, 78.2 g of an embedding compound are obtained which colours stoving enamels in greenish-tinged yellow shades having excellent light fastness.

X-ray diffraction spectrum: 11.22 (100), 9.02 (15), 5.69 (40), 4.81 (15), 4.17 (10), 3.84 (15d).

EXAMPLE 23

If Example 22 is followed, but, instead of the block polymer having an average molecular weight of about 8,500, the same amount of an analogously composed polymer having an average molecular weight of 12,000 (Pluriol SC 9361) is added, 79.3 g of a product are obtained which has properties similar to those of the product obtained according to Example 22.

EXAMPLE 24

A mixture of 25 g of an addition product of 30 mols of ethylene oxide to nonylphenol, 25 g of a commercially available resin based on hydrogenated abietic acid (Staybelite ®) and 150 ml of water of 90° C. is added at 95° C. to a suspension, prepared analogously to Example 16, of the sodium salt of azobarbituric acid. After 15 minutes a solution of 34.5 g of NiCl$_2 \times$6H$_2$O and 21 g of trisodium citrate in 100 ml of water is added, and the batch is heated for a further 4 hours at 95° C. The solids are then filtered off with suction, washed with hot water and dried at 70° C. in a circulating air drying cabinet. Yield: 96.2 g. The product colours plasticised PVC in greenish-tinged yellow shades.

X-ray diffraction spectrum: 11.37 (100), 9.06 (25), 8.05 (25), 5.66 (40d), 4.40 (15), 4.15 (10), 3.84 (35).

EXAMPLE 25

(a) 25 g of benzenesulphonohydrazide, 200 ml of water, 20 ml of 10N hydrochloric acid and 1.25 g of a condensation product of stearic acid with taurine are stirred for 30 minutes. 60 g of ice are added, and 34 ml of an aqueous sodium nitrite solution containing 30 g of sodium nitrite in 100 ml of solution are then added dropwise in the course of about 30 minutes. The batch is stirred for 30 minutes, an excess of nitrite being maintained. The nitrite excess is then destroyed with a small amount of sulphamic acid, and excess acid is neutralised with about 5 ml of 10N sodium hydroxide solution (pH 4–7). An emulsion of benzenesulphonyl azide is obtained.

(b) 18.1 g of barbituric acid and 30 ml of 10N sodium hydroxide solution are added to an emulsion prepared according to (a). The mixture is heated to 70° C. and maintained at this temperature for 2 hours. A solution or suspension of the sodium salt of diazobarbituric acid and which also contains benzenesulphonamide is obtained.

(c) 22.5 g of 2-cyanoiminobarbituric acid and 5 g of succinic acid are added to a suspension prepared according to (b), the mixture is briefly stirred, and the pH is then adjusted to 5.5–5.6 by means of about 7.5 ml of 10N sodium hydroxide solution. The temperature is increased to 95° C. and stirring is carried out for 6 hours, during which period the pH is maintained at a value of 5.5 and the temperature at 95° C. A suspension of the sodium salt of monocyanoiminoazobarbituric acid is formed.

(d) The pH value of a suspension prepared according to (c) is lowered with concentrated hydrochloric acid to pH 1 and the suspension is then heated for 1 hour at 95° C. The solids are then filtered off with suction at 90° C. and washed with hot water at 90° C. After the solids have been dried at 70° C. in a circulating air cabinet, 47.3 g of a compound which, in one of its possible tautomeric forms, corresponds to the following structural formula

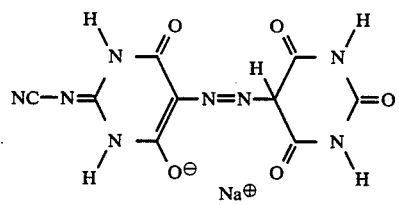

are obtained. The compound contains water of hydration, which is partially removed on more severe drying.

Analysis: (calculated for C$_9$H$_5$N$_8$O$_5$Na$\times$2H$_2$O; molecular weight 364.2): calculated: 29.7% C, 30.7% N, 6.39% Na. found: 30.8% C*, 30.6% N, 6.1 % Na.

*Since the last residues of contaminants (dispersing agents, excess coupling components, benzenesulphonamide) can only be washed out with difficulty, the carbon value is as a rule somewhat too high.

The IR spectrum in KBr ($\mu$) displays three intensive bands at 4.55, 6.15 and 7.3.

The compound colours paints and plastics in clear orange shades.

IR spectrum in KBr ($\mu$): 4.55; 6.15; 7.7.

The compound colours alkyd resin paints in orange shades.

EXAMPLE 26

A press cake prepared according to Example 25d and, according to its solids content, containing 45 g of the sodium salt of monocyanoiminoazobarbituric acid is stirred with 500 ml of water, and a solution of 33 g of $NiCl_2 \times 6H_2O$ and 21 g of trisodium citrate x 5.5 $H_2O$ in 100 ml of water is added dropwise at 95° C. in the course of about 5 minutes. The mixture is then heated for a further 4 hours at 95° C., and the solids are then filtered off with suction and thoroughly washed with hot water. After drying at 70° C., 51.8 g of a product which gives off a further 8.2 g of water at 160° C. are obtained.

Analysis: 24.2% C, 24.0% N, 13.2% Ni.

According to this analysis, the product is a 1:1 nickel complex of monocyanoiminoazoharbituric acid which, in addition to about 16% of water, could also contain a small amount of nickel citrate.

IR spectrum in KBr ($\mu$): 4.55; 5.8; 6.3; 7.15.

The compound colours alkyd resin paints in yellowish-brown shades.

EXAMPLE 27

If Example 26 is followed, but 30 g of 3-nitrobenzenesulphonamide are additionally added to the suspension of the sodium salt, 72.3 g of a product which gives off a further 2.8% of water at 160° C. are obtained.

The IR spectrum, in addition to the bands at 4.55, 5.8, 6.3 and 7.2$\mu$, also displays bands at 6.55 and 7.4$\mu$, which are not present in the product prepared according to Example 6 but can be traced back to 3-nitrobenzenesulphonamide.

EXAMPLE 28

If Example 26 is followed, but 40 g of the sodium salt of anthraquinone-2-sulphonic acid are additionally added to the suspension of the sodium salt and a solution of 50 g of $NiCl_2 \times 6H_2O$ and 21 g of trisodium citrate x 5.5 $H_2O$ in 150 ml of water is added dropwise, 79.2 g of a product which gives off a further 6.8% of water at 160° C. are obtained.

The IR spectrum, in addition to the bands displayed by the compound prepared according to Example 26, also has additional bands which can be traced back to anthraquinonesulphonic acid.

EXAMPLE 29

(a) 26.3 g of benzenesulphonohydrazide, 100 ml of water, 21 ml of 10N hydrochloric acid and 1.3 g of Emulgator [emulsifier] FD (a fatty alcohol/ethylene oxide addition product) are stirred for 30 minutes, 60 g of ice are added, and a solution of 19.5 g of sodium nitrite in 50 ml of water is then added dropwise in the course of about 30 minutes. The batch is stirred for 30 minutes, excess nitrite is then destroyed with a small amount of sulphamic acid, and excess acid is neutralised with about 5 ml of 10N sodium hydroxide solution. An emulsion of benzenesulphonyl azide is obtained.

(b) 40 ml of 10N sodium hydroxide solution are added to an emulsion prepared according to (a), and 21.6 g of 2-cyanoiminobarbituric acid are then sprinkled in. The batch is heated for 3 hours at 70° C., during which period the pH value sinks from initially about 13 to about 10. A solution or suspension of 2-cyanoimino-5-diazobarbituric acid is obtained.

(c) 22.2 g of 2-cyanoimino-4-iminobarbituric acid and 5 g of glutaric acid are added to a suspension prepared according to (b), the pH is adjusted with 5 ml of 10N hydrochloric acid to a value of 5.5, and the mixture is stirred for 5 hours at 95° C. and pH 5.5. The pH value is then adjusted with a small amount of hydrochloric acid to 4, 39 g of $BaCl_2 \times 2$ $H_2O$ are added, and the mixture is maintained for a further 5 hours at 95° C. and pH 4. On customary isolation, 66.1 g of a product are obtained which, in one of its tautomeric forms, is accorded the following probable structure:

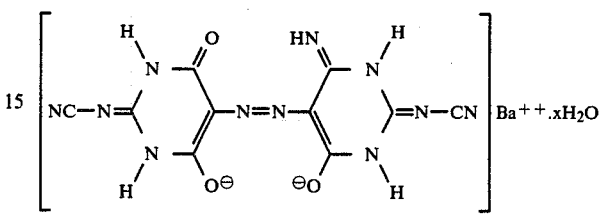

Analysis: (calculated for $(C_{10}H_5N_{11}O_3)$ Ba$\times$3 $H_2O$; molecular weight 518.6): calculated: 23.2% C, 29.7% N, 26.5% Ba. found: 24.0% C, 29.7% N, 24.2% Ba.

The compound colours alkyd resin paints in claret shades.

EXAMPLE 30

If the procedure of Examples 25a–25c is followed, but cyanoiminobarbituric acid is replaced by an equivalent amount of 2-(4-chlorophenylimino)-barbituric acid, then, after filtering off with suction and drying, 61.2 g of a product which, in one of its possible tautomeric forms, corresponds to the following structure

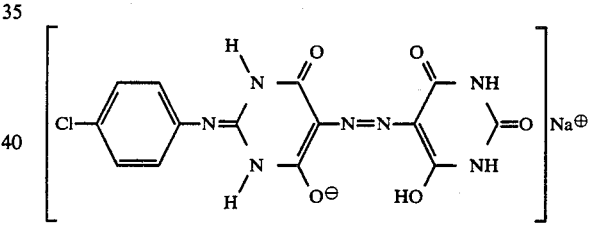

are obtained.

Analysis: (calculated for $(C_{14}H_9ClN_7O_5) \times Na \times 2$ $H_2O$; molecular weight 449.8)

The compound, incorporated in alkyd resin paint, produces yellow-orange colourations.

EXAMPLE 31

If Example 30 is followed, but the press cake is not dried and instead stirred again with 500 ml of water, the mixture heated at 95° C., 19.6 g of $BaCl_2 \times 2$ $H_2O$ added and the mixture again heated for 3 hours at 95° C., then, after the customary working-up, 66.5 g of a product which colours alkyd resin paint in orange shades are obtained.

Analysis: (calculated for $(C_{14}H_9ClN_7O_5)_2Ba \times 4$ $H_2O$; molecular weight 990.9): calculated: 33.9% C, 19.8% N. found: 34.7% C, 19.4% N.

EXAMPLE 32

If Example 31 is followed, but a solution of 34.5 g of $NiCl_2 \times 6$ $H_2O$ and 21 g of trisodium citrate x 5.5 $H_2O$ in 150 ml of water is added instead of barium chloride, 59.7 g of a 1:1 nickel complex which colours alkyd resin paint in yellow-brown shades are obtained.

EXAMPLE 33

If Example 32 is followed, but 30 g of Pluriol PE 6400 ®(commercially available ethylene oxide/propylene oxide block polymer) are additionally added before the addition of the nickel salt and the product is thoroughly washed not only with hot but also with cold water, 89.7 g of a molecular compound of the nickel 1:1 complex and the ethylene oxide/propylene oxide block polymer are obtained. The compound produces clearer shades than the product prepared according to Example 32.

EXAMPLE 34

(a) 22.5 g of 2-cyanoiminobarbituric acid and 10 g of trisodium citrate x 5.5 $H_2O$ are added to a 2-cyanoimino-5-diazobarbituric acid suspension prepared according to Example 29b, and the mixture is adjusted to pH 6.8 by means of 10N hydrochloric acid and heated for 16 hours at this pH value at 95° C. The solids are then filtered off with suction and washed with hot water at 80° C. A paste of the sodium salt of 4,4'-bis-cyanoiminoazobarbituric acid is obtained.

(b) A paste prepared according to 34a is stirred with 500 ml of water, 25 g of anhydrous sodium acetate are sprinkled in, and the mixture is heated to 95° C. A solution of 60 g of $NiCl_2 \times 6\, H_2O$ in 200 ml of water is added dropwise in the course of 5 minutes, and the batch is heated for a further 4 hours at 95° C. After the customary working-up, 63.7 g of a product which, in one of its tautomeric forms, is accorded the following probable structure

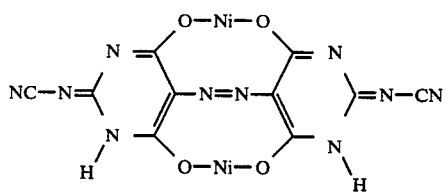

are obtained.

Analysis: (calculated for $C_{10}H_2N_{10}O_4 \times 2\, Ni \times 8\, H_2O$; molecular weight 857.7): calculated: 20.4% C, 23.8% N, 20.0% Ni. found: 20.8% C, 23.5% N, 19.1% Ni.

The compound produces in alkyd resin paints yellowish-tinged brown shades.

EXAMPLE 35

If Example 34b is followed, but 30 g of 3-nitrobenzenesulphonamide are added to the batch before the dropwise addition of the nickel salt solution, 80.0 g of a product which predominantly consists of a molecular compound of the complex according to Example 34 and 3-nitrobenzenesulphonamide and from which only a small amount of the benzenesulphonamide can be washed out even with a large amount of hot water are obtained.

The substance colours alkyd resin paints in clearer shades than the product prepared according to Example 34.

We claim:

1. An inclusion compound, intercalation compound or solid solution which is a nickel salt or nickel complex, of a compound which, in one of its tauteromeric structures, corresponds to the formula

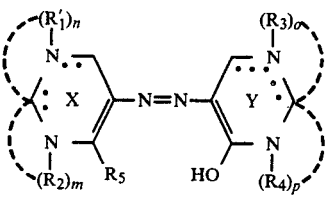

in which the rings designated

X and Y are unsubstituted or are substituted by one or two substituents from the group consisting of =O, =S, =$NR_7$, —$NR_6R_7$, —$OR_6$, —$SR_6$, —$COOR_6$, —CN, —$CONR_6R_7$, —$SO_2R_8$,

alkyl, cycloalkyl, aryl and aralkyl, the total number of the endocyclic and exocyclic double bonds for each of the rings X and Y being three, $R_6$ represents hydrogen, alkyl, cycloalkyl, aryl or aralkyl and $R_7$ represents hydrogen, cyano, alkyl, cycloalkyl, aryl, aralkyl, $C_1$-$C_6$-alkyl-carbonyl, phenylcarbonyl, $C_1$-$C_6$-alkylsulphonyl, phenylsulphonyl, carbamoyl, carbamoyl which is substituted by $C_1$-$C_6$-alkyl, phenyl or napthyl, sulphamoyl, sulphamoyl substituted by $C_1$-$C_6$-alkyl, phenyl or napthyl, guanyl, guanyl substituted by Chd 1-$C_6$-alkyl, phenyl or naphthyl, wherein the alkyl radicals mentioned are substituted or are unsubstituted by radicals selected from halogen, —OH, —CN, —$NH_2$ or $C_1$-$C_6$-alkoxy and the phenyl and naphthyl radicals mentioned are unsubstituted or are substituted by radicals selected from halogen, —OH, $C_1$-$C_6$-alkyl, $C_1$-$C_6$-alkoxy, —$NH_2$, —$NO_2$ or —CN, and $R_8$ designates alkyl, cycloalkyl, aryl or aralkyl, $R_1$, $R_2$, $R_3$ and $R_4$ represent hydrogen, alkyl, cycloalkyl, aryl or aralkyl or, as indicated by the broken lines in the formula, form a triazole, imidazole, benzimidazole, pyrimidine or quinazoline ring or a triazole, imidazole, benzimidazole, pyrimidine or quinazoline ring to which further rings are fused, $R_5$ designates —OH, —$NR_6R_7$, alkyl, cycloalkyl, aryl, or aralkyl, and m, n, o and p each are 1, or in the case where double bonds extend from the ring nitrogen atoms, as indicated by the dotted lines in the formula, each are 0 or 1 containing at least one other included compound, except for one composition of matter which consists of 45 to 82% by weight of azobarbituric acid/nickel 1:1 complex, 3 to 15% by weight of benzene-sulphonamide, 5 to 20% by weight of nickel acetate and 10 to 20% by weight of water.

2. An inclusion compound, intercalation compound or solid solution according to claim 1, wherein the colored organic nickel salt or nickel complex is a salt or a complex of azobartituric acid.

3. An inclusion compound, intercalation compound or solid solution according to claim 1, containing embedded therein a cyclic or acyclic organic compound.

4. An inclusion compound, intercalation compound or solid solution according to claim 1, containing a carboxamide or sulphonamide.

5. An inclusion compound, intercalation compound or solid solution according to claim 1, containing a surface-active compound.

6. An inclusion compound, intercalation compound or solid solution according to claim 1, containing embedded therein natural resins and resin acids in their conversion products and salts.

7. An inclusion compound, intercalation compound or solid solution according to claim 1, containing embedded therein a polymer.

8. An inclusion compound, intercalcation compound or solid solution according to claim 1 containing embedded therein one or more dyestuffs.

9. An inclusion compound, intercalation compound or solid solution according to claim 1, wherein the ring X of said colored organic nickel salt or nickel complex is selected from the group consisting of

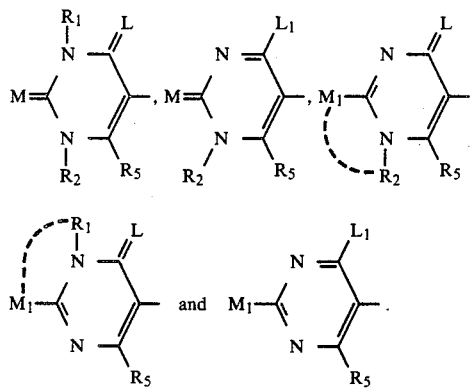

in which

L and M are =O, =S or =NR$_6$,

L$_1$ designates hydrogen, —OR$_6$, —SR$_6$, —NR$_6$R$_7$, —COOR$_6$, —CONR$_6$R$_7$, —CN, alkyl, cycloalkyl, aryl or aralkyl and M$_1$ designates —OR$_6$, —SR$_6$, —NR$_6$R$_7$, —COOR$_6$, —CONR$_6$R$_7$, —CN, —SO$_2$R$_8$,

—N—CN,
   |
   R$_6$ alkyl, cycloalkyl, aryl or aralkyl.

10. An inclusion compound intercalation compound or solid solution according to claim 9, wherein M$_1$ and R$_1$ or M$_1$ and R$_2$ form a 5- or 6-membered ring.

11. An inclusion compound, intercalation compound or solid solution, according to claim 1, wherein the ring Y of said colored organic nickel salt or nickel complex is selected from the group consisting of

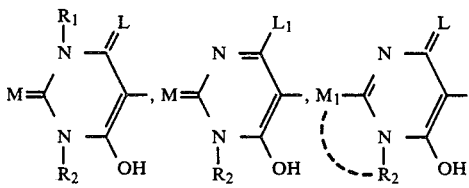

-continued

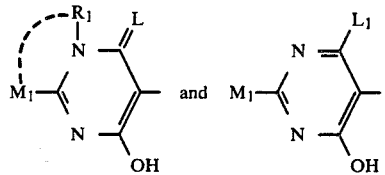

wherein

L and M are =O, =S or =NR$_6$

L$_1$ designate hydrogen, —OR$_6$, —SR$_6$, —NR$_6$R$_7$, —COOR$_6$, CONR$_6$R$_7$, —CN, alkyl, cycloalkyl, aryl or aralkyl and M$_1$ designated —OR$_6$, —SR$_6$, —NR$_6$R$_7$, —COOR$_6$, —CONR$_6$R$_7$, —CN, —SO$_2$R$_8$,

—N—CN,
   |
   R$_6$ alkyl, cycloalkyl, aryl or aralkyl.

12. An inclusion compound, intercalation compund or solid solution, according to claim 1, wherein said organic nickel salt or nickel complex in the form of its free acid is selected from the group consisting of

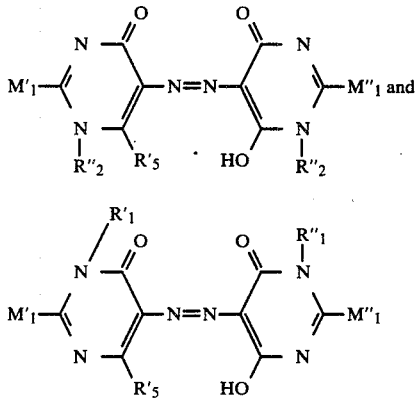

in which

R$_5'$ designates —OH or —NH$_2$,

R$_1'$, R$_1''$, R$_2'$ and R$_2''$ represent hydrogen and

M$_1'$ and M$_1''$ designate hydrogen, —OH, —NH$_2$, —NHCN, arylamino, (C$_1$-C$_6$-alkyl)-carbonylamino, phenylcarbonylamino, C$_1$-C$_6$-alkylsulphamoylamino phenylsulphonylamino, carbomoylamino, carbamoylaminde substituted in the sulphamoyl moiety by C$_1$-C$_6$-alkyl, phenyl or naphthyl, sulphamoylamino, sulphoamoylamino substituted in the sulphamoyl moiety by C$_1$-C$_6$-alkyl, phenyl or naphthyl, guanylamino, guanylamino substituted in the guanyl moiety by C$_1$-C$_6$-alkyl, phenyl or naphthyl, wherein the alkyl radicals mentioned are unsubstituted or are substituted by a radical selected from halogen, —OH, —CH, —NH$_2$ or C$_1$-C$_6$-alkoxy and for the phenyl and napthyl radicals mentioned are unsubstituted or are substituted by radicals selected from halogen, —OH, C$_1$-C$_6$-alkyl, C$_1$-C$_6$-alkoxy, —NH$_2$—NO$_2$ or —CN.

13. An inclusion compound, intercalation compound or solid solution according to claim 2, wherein said salt or complex of azobarbituric acid is azobarbituric acid/nickel 1:1 complex.

14. An inclusion compound, intercalation compound or solid solution according to claim 5, wherein said surface-active compound is a surfactant.

15. An inclusion compound, intercalation compound or solid solution according to claim 7, wherein said polymer is a water-soluble polymer.

16. An inclusion compound, intercalation compound or solid solution according to claim 7, wherein said polymer is selected from the group consisting of ethylene/propylene oxide block polymer, polyvinyl alcohol, poly(meth)acrylic acid and modified cellulose.

17. An inclusion compound, intercalation compound or solid solution according to claim 16, wherein said modified cellulose is selected from the group consisting of carboxymethylcellulose, hydroxyethylcellulose, hydroxypropylcellulose, methylhydroxycellulose and ethylhydroxyethylcellulose.

18. An inclusion compund, intercalation compound or solid solution according to claim 8, wherein said dyestuff is selected from the group consisting of azo dyestuffs, anthraquinone dyestuffs, quinophthalone dyestuffs, azo-methines, phthalocyanine dyestuffs and triphenylmethane dyestuffs.

19. An inclusion compound, intercalation compound or solid solution according to claim 12 wherein $M_1R_1$ or $M_2$ and $R_2$ form a 5-or 6-membered ring.

20. An inclusion compound, intercalation compound or solid solution according to claim 1 containing melamine.

* * * * *

UNITED STATES PATENT AND TRADEMARK OFFICE
CERTIFICATE OF CORRECTION

PATENT NO. : 4,622,391  Page 1 of 2
DATED : Nov. 11, 1986
INVENTOR(S) : Manfred Lorenz It is certified that error appears in the above-identified patent and that said Letters Patent is hereby corrected as shown below:

| | |
|---|---|
| Abstract, line 5 | Delete dashes inside of formula "X" and "Y" and substitute dots |
| Col. 17, line 11 | Delete "surFactants" and substitute --surfactants-- |
| Col. 17, line 21 | Insert space between "$\alpha$" and "radiation" |
| Col. 18, line 48 | Delete "9.8" and substitute --9.2-- |
| Col. 18, line 65 | Correct spelling of --ethylene-- |
| Col. 26, line 34 | Delete "Chd 1" and substitute --$C_1$-- |
| Col. 28, lines 52,53 | Correct spelling of --carbamoyl amine-- |
| Col. 30, line 2 | Delete "methylhydroxycellulose" and substitute --methylhydroxyethylcellulose-- |

UNITED STATES PATENT AND TRADEMARK OFFICE
CERTIFICATE OF CORRECTION

PATENT NO. : 4,622,391  Page 2 of 2
DATED : Nov. 11, 1986
INVENTOR(S) : Manfred Lorenz It is certified that error appears in the above-identified patent and that said Letters Patent is hereby corrected as shown below:

Col. 30, line 4   Correct spelling of --compound--

Col. 30, line 11  Delete "claim 12" and substitute --claim 11--

Signed and Sealed this

Twenty-fourth Day of March, 1987

Attest:

DONALD J. QUIGG

Attesting Officer    Commissioner of Patents and Trademarks